Figure 1:
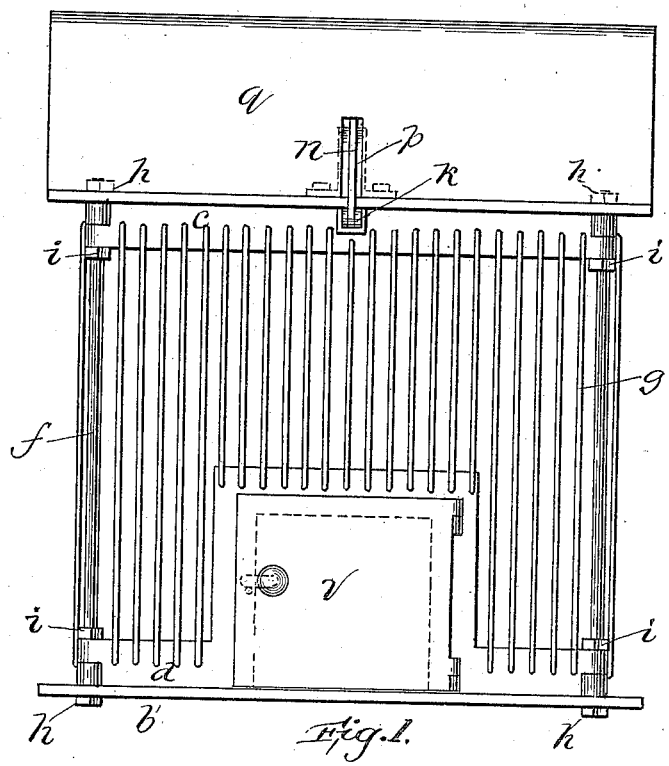

No. 688,770. Patented Dec. 10, 1901.
M. J. CANNON.
SELF SETTING ANIMAL TRAP.
(Application filed Mar. 18, 1899. Renewed Mar. 22, 1901.)

(No Model.) 2 Sheets—Sheet 1.

Witnesses:
Arthur O. Randall,
Annie J. Dailey.

Inventor:
M. J. Cannon,
by Crossley and Goddard
Attorneys.

No. 688,770. Patented Dec. 10, 1901.
M. J. CANNON.
SELF SETTING ANIMAL TRAP.
(Application filed Mar. 18, 1899. Renewed Mar. 22, 1901.)
(No Model.) 2 Sheets—Sheet 2.
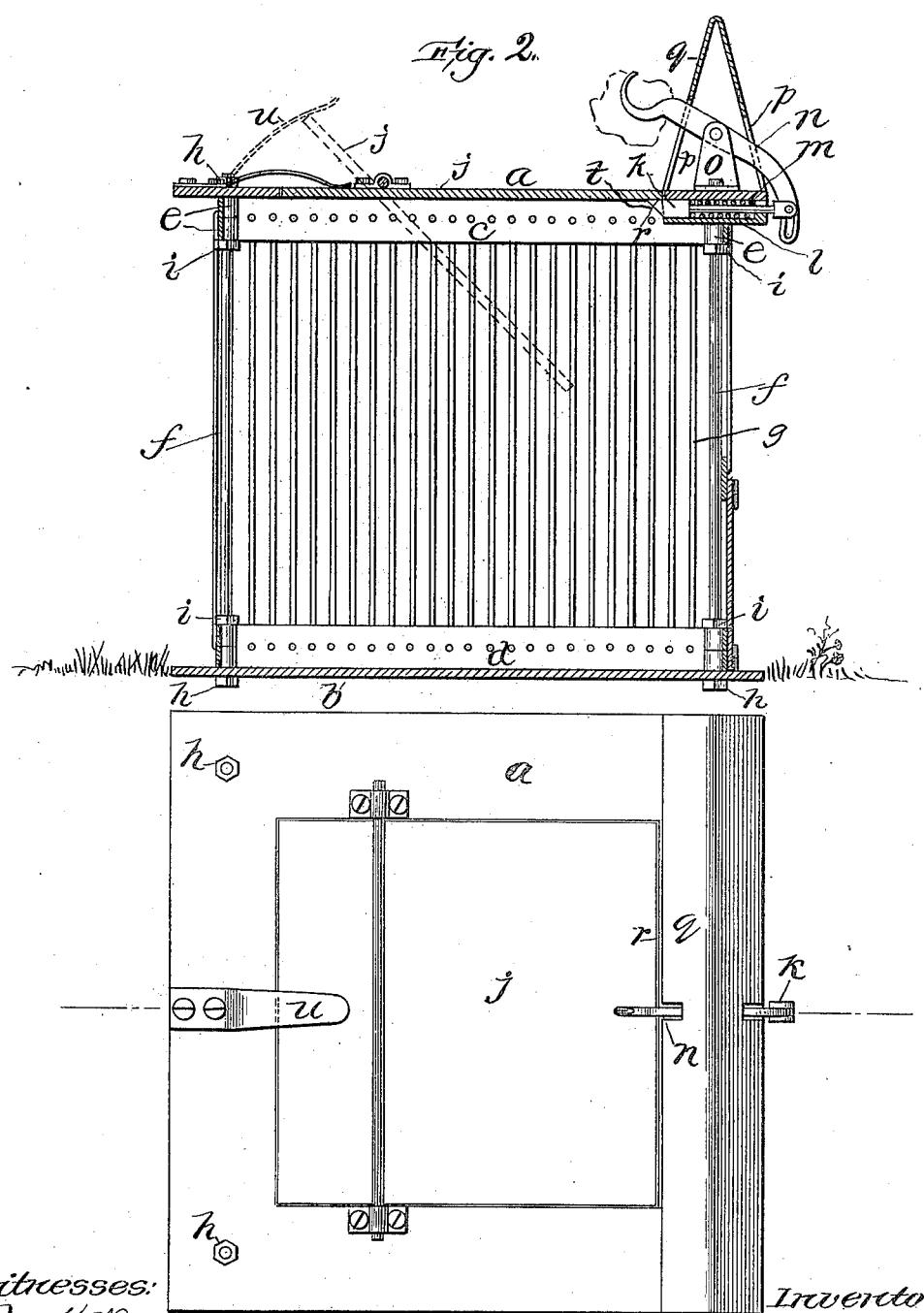
Witnesses:
Roy K. Hill
Annie J. Dailey
Inventor
M. J. Cannon.
by Crossley & Goddard,
Attorneys

UNITED STATES PATENT OFFICE.

MICHAEL J. CANNON, OF BOSTON, MASSACHUSETTS.

SELF-SETTING ANIMAL-TRAP.

SPECIFICATION forming part of Letters Patent No. 688,770, dated December 10, 1901.

Application filed March 18, 1899. Renewed March 22, 1901. Serial No. 52,400. (No model.)

*To all whom it may concern:*

Be it known that I, MICHAEL J. CANNON, of Boston, in the county of Suffolk and State of Massachusetts, have invented certain new and useful Improvements in Self-Setting Animal-Traps, of which the following is a description sufficiently full, clear, and exact to enable those skilled in the art to which it appertains or with which it is most nearly connected to make and use the same.

This invention has relation to that kind of traps that are adapted to catch animals alive and that are constructed so as to be automatically reset immediately after the trapping of each animal, thus adapting a single trap to catch alive and unharmed any number of animals to the full capacity of the trap.

It is the object of the invention to provide a trap of which the animal, even through its most acute cunning, will not be likely to be shy and which may be automatically reset after each operation, so that it may be capable of catching any number of animals.

It is also the object of the invention to provide a perfect "knockdown trap" of the kind mentioned, so as to adapt it to be stored and shipped in commercial and other transactions without occupying more than a minimum amount of space.

To these ends the invention consists in certain novel features of construction and combinations of parts, a preferred form of embodiment of which is illustrated in the accompanying drawings and specifically described hereinafter, and the essential elements of which are enumerated in the appended claim.

Reference is to be had to the annexed drawings and to the letters marked thereon, forming a part of this specification, the same letters designating the same parts or features, as the case may be, wherever they occur.

Of the drawings, Figure 1 is a front view of my improved self-setting animal-trap. Fig. 2 is a vertical central sectional view taken through the trap from front to rear. Fig. 3 is a plan view.

In the drawings, $a$ designates the top, and $b$ the bottom, of the trap. The said top and bottom may consist of plates of metal or any other suitable material.

As is herein shown, the trap is made square, though it will become manifest from the following description that this form is not essential, since it may be made of other shapes.

Each side consists of a top bar $c$ and a bottom bar $d$. Each bar at its ends has a half part cut away, and the other half is turned over to form a hinge-like knuckle $e$.

$g$ designates rods extending between the bars $c$ and $d$ and suitably connected therewith to form, as it were, an open grating.

$f$ designates rods screw-threaded at their ends. The said rods $f$ are passed through the knuckles $e$ of the bars $c$ and $d$ and through holes made in the plates $a$ and $b$, and nuts $h$ $i$ turned on the rods against the plates and knuckles serve to hold them together and to form the cage of the trap, as shown.

$j$ designates a drop or lid made to fit an opening in the top $a$ and pivoted at its sides to the top, so that its forward end may be tipped downward, as is shown by dotted lines in Fig. 2, and so also that it may be held up in a substantially horizontal position and substantially on a level with the top of the box by a latch $k$, supported by a guide $l$, and pressed normally forward under the lid $j$ by a spring $m$. The lower end of a lever $n$ is loosely connected with the outer end of the latch $k$, the upper end of the said lever extending over the lid $j$. The said lever $n$ is fulcrumed on a lug $o$ on the cage and extends through slots $p$ made in a plate $q$ bent into an inverted-V shape in cross-section and secured on the top of the cage, with the inner face adjacent to the forward edge $r$ of the lid $j$. The inner end of the lever $n$ may be formed as a hook or otherwise constructed to receive a bait; and the lower face of the inner end of the latch $k$ is beveled, as at $t$, so that the lid when it swings to horizontal position from the position in which it is shown in Fig. 2 will be latched in said horizontal position; and in order to restore the lid to horizontal position after its forward end has been depressed a spring $u$ may be made to operate on the rear end. This spring may be made to bear down upon the rear end of the lid or to draw down thereon, as may be most convenient or best suited to the circumstances.

A door $v$ is provided whereby access may be gained to the cage of the trap.

In the use of my trap, after it is set up a bait may be hung upon the inner end of the bait-lever *n*, as shown by dotted lines in Fig. 2, when the animal, whatever it may be, getting upon the lid *j* and reaching for the bait and drawing upon the inner end of the lever, will withdraw the latch *k*, so as to allow the inner end of the lid to drop to the dotted-line position shown in Fig. 1, and so dump, as it were, the animal into the cage. After the animal shall have slid off from the lid it will be returned to normal position by the action of the spring *u*, or it may be by gravity if the lid is constructed so that its rear end may overbalance its forward end. After the inner end of the lid passes above the latch the latter will return to normal position by action of the spring *m* and so reset the trap and bring the lid into position to have another animal acting thereon caught in the trap, as before described. The plate *q* being arranged in the position shown will prevent the animal, after the latch has been withdrawn, from catching upon any part of the trap, so as to avoid being dumped into the cage.

It is obvious that the plate *q* and the lever *n* and manner of pivoting it, as also the form of the latch coöperating with the lid *j*, may be varied in form from that shown in the drawings without departing from the nature or spirit of the invention, and, furthermore, the sides of the cage may be varied in form, since it is not necessary that the wires, such as are shown, should extend between the bars *c* and *d*. Any other form of connection suited to the purpose will answer the ends of my trap.

By making the parts so that they can be separated, as hereinbefore described, it will be seen that a knockdown trap may be made so that it may be packed in very compact form for shipping or storage.

The trap may be made of any size desired, as it may be desired to catch larger or smaller animals, as a mouse-trap of quite small size with a latch *k*, delicately operated, or it may be made of a size even large enough to entrap a bear, with the parts made correspondingly strong and to suit circumstances.

Having thus explained the nature of the invention and described a way of constructing and using the same, though without attempting to set forth all of the forms in which it may be made or all of the modes of its use, it is declared that what is claimed is—

An animal-trap embodying in its construction a cage having a top provided with a pivoted drop-lid yieldingly actuated to closed position; a spring-held sliding latch engaging under the free end of said lid for holding the latter in normally closed position; a bait-holding lever pivoted intermediate its ends and having one end projecting over the lid and the other end turned downwardly and operatively connected with the latch to withdraw the same and allow the lid to drop to open position under the weight of the animal; together with a guard-plate affixed to the top of the cage and housing the pivot of the lever, said plate having a sloping side extending to the edge of the opening in the cage-top.

In testimony whereof I have signed my name to this specification, in the presence of two subscribing witnesses, this 6th day of March, A. D. 1899.

MICHAEL J. CANNON.

Witnesses:
ARTHUR W. CROSSLEY,
GEO. N. GODDARD.